US008839089B2

(12) United States Patent
Dorrell

(10) Patent No.: US 8,839,089 B2
(45) Date of Patent: Sep. 16, 2014

(54) MULTI-DIMENSIONAL DATA MANIPULATION AND PRESENTATION

(75) Inventor: Wade Clark Dorrell, Boise, ID (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 13/286,223

(22) Filed: Nov. 1, 2011

(65) Prior Publication Data

US 2013/0111321 A1     May 2, 2013

(51) Int. Cl.
| G06F 17/00 | (2006.01) |
| G06F 9/44 | (2006.01) |
| G06F 17/24 | (2006.01) |
| G06F 17/21 | (2006.01) |
| G06F 17/30 | (2006.01) |

(52) U.S. Cl.
CPC ... *G06F 9/44* (2013.01); *G06F 17/24* (2013.01); *G06F 17/211* (2013.01); *G06F 17/246* (2013.01); *G06F 17/245* (2013.01); *G06F 17/30* (2013.01); *G06F 9/4443* (2013.01)
USPC ........................................................ 715/212

(58) Field of Classification Search
CPC ..... G06F 17/24; G06F 17/211; G06F 17/245; G06F 17/246
USPC .......... 715/212, 213, 214, 217, 218, 219, 220
See application file for complete search history.

(56) References Cited

U.S. PATENT DOCUMENTS

| 5,933,830 | A | | 8/1999 | Williams |
| 6,078,924 | A | * | 6/2000 | Ainsbury et al. ...................... 1/1 |
| 6,101,556 | A | * | 8/2000 | Piskiel et al. ................ 719/313 |
| 6,626,959 | B1 | | 9/2003 | Moise et al. |
| 7,434,177 | B1 | | 10/2008 | Ording et al. |
| 7,567,262 | B1 | * | 7/2009 | Clemens et al. .............. 345/632 |
| 7,685,525 | B2 | * | 3/2010 | Kumar et al. ................. 715/744 |
| 2002/0029208 | A1 | * | 3/2002 | Josephson ......................... 707/1 |
| 2004/0236754 | A1 | * | 11/2004 | Workman et al. ............... 707/10 |

(Continued)

OTHER PUBLICATIONS

Roth, et al., "Towards an Information Visualization Workspace: Combining Multiple Means of Expression", Retrieved at <<http://citeseerx.ist.psu.edu/viewdoc/download?doi=10.1.1.41.5982&rep=rep1&type=pdf>>, Human-Computer Interaction Journal, vol. 12, Nos. 1 & 2, 1997, pp. 1-64.

(Continued)

*Primary Examiner* — Laurie Ries
(74) *Attorney, Agent, or Firm* — Tom Wong; Jim Ross; Micky Minhas

(57) ABSTRACT

A multi-dimensional data reporting system presents a data report based on a data model, creates a callout report model based on a cell in the data report, and presents an instance of the callout report model in a callout interface. In one implementation of the multi-dimensional data reporting system, upon receiving a callout control associated with selected cell of the data report, the system retrieves the multi-dimensional data associated with the selected cell, builds the callout report model based on the retrieved multi-dimensional data, and presents an instance of the callout report model in a callout interface. In one implementation, the callout interface provides the capability to change the type and the dimensionality of the instance of the callout report model in the callout interface. The callout interface also allows inserting the instance into the data report and to update the data report based on the instance.

20 Claims, 8 Drawing Sheets

(56) References Cited

U.S. PATENT DOCUMENTS

| | | | |
|---|---|---|---|
| 2005/0015624 A1* | 1/2005 | Ginter et al. | 713/201 |
| 2007/0143661 A1 | 6/2007 | Machalek | |
| 2008/0065626 A1 | 3/2008 | Jain et al. | |
| 2008/0294680 A1 | 11/2008 | Powell et al. | |
| 2010/0017872 A1 | 1/2010 | Goertz et al. | |
| 2010/0161290 A1 | 6/2010 | Duchenay et al. | |
| 2010/0229122 A1 | 9/2010 | McCormack et al. | |
| 2010/0318891 A1* | 12/2010 | Lo et al. | 715/214 |
| 2011/0055677 A1* | 3/2011 | Lima et al. | 715/201 |
| 2012/0130758 A9* | 5/2012 | Morinville | 705/7.12 |
| 2012/0204121 A1* | 8/2012 | Lauridsen et al. | 715/760 |

OTHER PUBLICATIONS

"Enterprise-Class Features Delivered on Google's World-Class Platform", Retrieved at <<http://www.google.co /analytics/features.html>>, Retrieved Date: Aug. 25, 2011, pp. 4.

"OLAP Statistics and Reporting for Outlook", Retrieved at <<http://www.assistmyteam.net/OLAPStatistics/>>, Retrieved Date: Aug. 25, 2011, pp. 4.

Kirpes, Dan J., "Building a 'Pre-subsetting' User Interface for Multidimensional Reports", Retrieved at <<http://www2.sas.com/proceedings/sugi24/AppDevel/p33-24.pdf>>, Retrieved Date: Aug. 25, 2011, pp. 5.

Hartley, Clayton A., "Web-Based COGNOS PowerPlay Training Manual", Retrieved at <<http://www.smcm.edu/cognos/_assets/Training%20Docs/PowerPlay%20Training/PowerPlay%20Training%20Doc.pdf>>, Retrieved Date: Aug. 25, 2011, pp. 29.

"Automatic Generation of Trend Charts", U.S. Appl. No. 13/206,614, filed Aug. 10, 2011, pp. 33.

"International Search Report", Mailed Date: Mar. 27, 2013, Application No. PCT/US2012/062883, Filed Date: Oct. 31, 2012, pp. 8.

* cited by examiner

300 ↘

| Internet Order Count | Sale Date | | | | |
|---|---|---|---|---|---|
| Sale Region | ▼ | ⊞ CY 2001 | ⊞ CY 2002 | ⊞ CY 2003 | ⊞ CY 2004 |
| ⊞ Australia | | 394 | 859 | 2,600 | 2,865 |
| ⊞ Canada | | 47 | 226 | 1,334 | 1,768 |
| ⊞ France | | 59 | 233 | 1,034 | 1,158 |
| ⊞ Germany | | 76 | 233 | 990 | 1,185 |
| ⊞ United Kingdom | | 96 | 265 | 1,261 | 1,409 |
| ⊞ United States | | 341 | 861 | 3,700 | 4,665 |

⌐ 302

| Internet Order Count | Sale Date | | | | |
|---|---|---|---|---|---|
| Sale Region | ▼ | ⊞ CY 2001 | ⊞ CY 2002 | ⊞ CY 2003 | ⊞ CY 2004 |
| ⊞ Australia | | 394 | 859 | 2,600 | 2,865 |
| ⊞ Canada | | 47 | 226 | 1,334 | 1,768 |
| ⊞ France | | 59 | 233 | 1,034 | 1,158 |
| ⊞ Germany | | 76 | 233 | 990 | 1,185 |
| ⊞ United Kingdom | | 96 | 265 | 1,261 | 1,409 |
| ⊞ United States | | 341 | 861 | 3,700 | 4,665 |

⌐ 304

⌐ 310

⌐ 320

MULTI-DIMENSIONAL DATA MANIPULATION AND PRESENTATION

BACKGROUND

Popular reporting software used for reporting of multi-dimensional data provide various methods of filtering reports based on different dimensions. For example, a retail company selling merchandise using the Internet can use a spreadsheet to report the sales orders by the region, by the product, by the quarter, etc. An example sales order report used by a sales executive in a retail company includes the individual rows displaying sales orders for particular countries and the individual column displaying sales orders for particular calendar years. The sales executive shares such a sales order report with the other stakeholders in the company, such as the marketing executives, the board of directors, etc.

However, it is difficult for the sales executive to envision the kind of data analysis used by the other stakeholders. For example, a marketing executive is interested in the sales orders by the gender, whereas a financial executive is interested in the sales orders by the product profit margin. It is difficult for the sales executive creating the sales order report to take such diverse needs into consideration when creating the report. On the other hand, because the marketing executive does not know the structure used by the sales executive to generate the sales order report, it would be difficult for the marketing executive to explore the multi-dimensional data behind the sales order report. Especially, the needs of the marketing executive to drill down into the product data behind the various cells of the sales order report is different than the needs of the financial executive to drill down into the profit margin data. As a result, each of the stakeholders ends up using considerable amount of time reconfiguring and reformatting the sales order reports to extract the information in which they are interested.

SUMMARY

Implementations described and claimed herein address the foregoing problems by providing a method and system for presenting the multi-dimensional data using a callout interface. An implementation of the multi-dimensional data reporting system presents a data report based on a data model, creates a callout report model based on a cell in the data report, and presents an instance of the callout report model in a callout interface. In one implementation of the multi-dimensional data reporting system, upon receiving a callout control associated with selected cell of an existing data report, the system retrieves multi-dimensional data associated with the selected cell of the data report, builds the callout report model based on the retrieved multi-dimensional data, and presents an instance of the callout report model in a callout interface. In one implementation, the callout interface provides the capability to change the type and the dimensionality of the instance of the callout report model in the callout interface. The callout interface also allows inserting the instance into the data report and to update the data report based on the instance.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The multi-dimensional data reporting system disclosed herein allows users to explore data underlying multi-dimensional reports without requiring reconfiguration of the reports. For example, using the multi-dimensional data reporting system, a sales order report generated by a sales executive can be used by a marketing executive to get information underlying the sales figures in various cells of the sales order report. The multi-dimensional data reporting system provides a callout interface that can be invoked from the various cells of a multi-dimensional report, such as a data report provided on a worksheet of a reporting software. For example, various cells of a sales order report summarizing sales for a particular product over a number of regions and time periods include sales for a particular geographical area and for a given time period. A marketing executive using such a sales order report can invoke a callout interface from an individual cell to get further detailed information about the sale by product line, the cell by customer type, etc., in a callout interface.

In one implementation, the callout interface displays a chart based on the data in the cell that is selected when the callout interface is invoked. Thus, for example, if the selected cell contains the total of the sales orders in the United States for the calendar year 2004, the callout interface displays a line-chart showing the sales orders in the United States for the calendar year 2004 by the sales date. The callout interface also displays the other dimensions of the data underlying the selected cell in a dimensions listing. For example, a column on the left side of the callout interface displays "customer," "product," and "promotion," as the other dimensions of the data summarizing the sales orders in the United States for the calendar year 2004.

Furthermore, the multi-dimensional data reporting system also allows a user to pull out a chart or a report from the callout interface into the original data report. Thus, if the marketing executive looking at a chart in a callout interface that is based for the sales orders per product line finds it important for the future use, the marketing executive can select an insert control to insert such a chart in the worksheet including the original data report. On the other hand, the data underlying the chart in the callout interface can be substituted for the data underlying the original data report in the worksheet. Yet alternatively, the marketing executive can select one of the other dimensions on the callout interface to review a different chart in the callout interface. For example, the marketing executive can select the "customer" dimension from the callout interface to view a chart for the Internet sales orders categorized by "customers" for the sales orders in the United States for the calendar year 2004.

Figure 1:
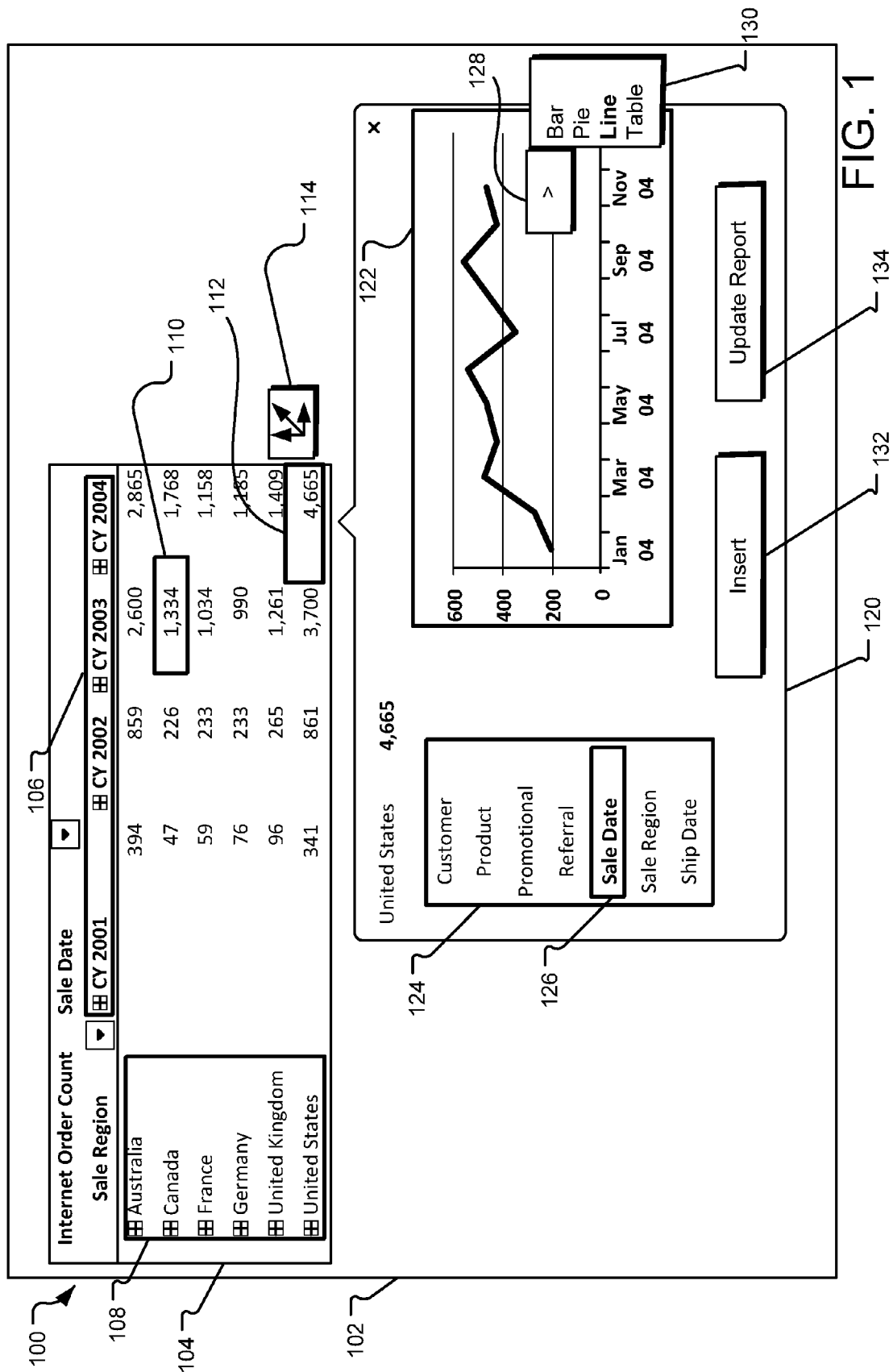
FIG. 1 illustrates the example user interface of a multi-dimensional data reporting system.

FIG. 1 illustrates an example user interface 100 of a multi-dimensional data reporting system. Specifically, the user interface 100 includes a worksheet 102 used to analyze and present the multi-dimensional data. The worksheet 102 includes a sales order report 104 generated by a sales executive and summarizing the Internet sales orders for a company. For example, the sales executive generates the sales order report 104 by generating a report model based on a sales order data model for the company. Each column 106 of the sales order report 104 summarizes the sales orders for a particular year of the calendar year 2001-2004. Each row 108 of the sales order report 104 summarizes sales orders for a particular region of the regions Australia, Canada, France, Germany, the United Kingdom, and the United States. Thus, each of the cells 110 will display the total sales orders in a particular country for a particular calendar year. Thus, for example, the cell 110 displays the total sales orders in Canada for the calendar year 2003, whereas the cell 112 displays the total sales orders in the United States for the calendar year 2004.

The sales order report 104 can be shared by a number of other stakeholders in the company. For example, the sales order report 104 can be shared by e-mail with a marketing executive. In such a case, it is likely that the marketing executive is interested in different data compared to that provided in the sales order report 104. For example, a marketing executive that is responsible for marketing in the United States is interested in further drilling down into the sales order data for the United States. The sales order report 104 displays the sales orders in the United States for the calendar year 2004 to be 4,665.

In such a case, when the marketing executive selects the cell 112, a callout control 114 is presented to the marketing executive. Upon selection of the callout control, a callout interface 120 is presented to the marketing executive. The callout interface 120 is a graphical user interface (GUI) that allows the user to present further detail about the data underlying the selected cell 112. In one example implementation, the callout interface 120 displays a chart 122 including a graph of the sales orders by Sale Date in the United States for the calendar year 2004. The callout interface 120 also displays a dimension listing 124 of the various dimensions for the data underlying the selected cell 112. In the illustrated dimension listing 124, the dimensions of "Customer," "Product," "Promotion," "Referral," " Sale Date," "Sale Region," and "Ship Date," are provided. Given that the callout interface 120 uses the dimension of "Sale Date" 126 in the chart 122, the callout interface 120 highlights the "Sale Date" dimension 126.

The callout interface 120 also includes a chart type control 128 that allows the user to view different chart types using the data used to generate the currently displayed chart. For example, the marketing executive can select the chart type control 128 to get a chart type listing 130 listing various chart types that can be viewed by the marketing executive. In the illustrated example, the existing line chart 122 can be converted to a bar chart by selecting the "Bar" option, to a pie chart by selecting the "Pie" option, etc. Yet alternatively, if the marketing executive is interested in reviewing the actual numbers, the selection of the "Table" option will replace the line chart 122 with a table with various cells displaying the sales order numbers by the "Sale Date."

In an example implementation, the data used to generate the line chart 122 in the callout interface 120 is stored in a temporary workspace, such as a random access memory or a cache memory. For example, a callout report model stored in the cache memory can store the data used for generating the callout interface. This allows a user to analyze and view the data from the temporary workspace in different formats, presentations, etc. However, if the user likes a particular presentation of the data in the callout interface, such presentation can be permanently added to the data report model. For example, an implementation of the callout interface 120 also provides an insert control 132 that can be used by a user to insert the line chart 122 into the worksheet 102 containing the sales order report 104. Thus, if the marketing executive is interested in using the line chart 122 for further analysis or for a presentation, by selecting the insert control 132, the marketing executive can permanently add the line chart 122 to the worksheet 102.

Furthermore, the callout interface 120 also includes an update report control 134 that allows a user to update the original data report from which the callout interface 120 is generated. For example, if the marketing executive believes that it is more important to insert the data used to generate the line chart 122 into the sales order report 104, the update report control 134 allows her to do so. Updating the sales order report 104 with the new data from the callout interface 120 allows the marketing executive to further drill into the new dataset. For example, after updating the sales order report 104, the marketing executive can select one of the cells from the updated sales order report 104 and generate a new callout interface to analyze the data from the newly selected cell.

The selection of the dimensions in the dimension listing 124 depends upon the existing dimensions provided in the sales order report 104, other preferences provided by a user, the underlying data for the selected cell 112, etc. For example, because the sales order data in the sales order report 104 already provides details by the country and by the calendar year, the dimensions for the country and for the calendar year are not listed in the dimensions listing 124. Alternatively, in one implementation, the dimensions for the dimension listing 124 are selected based on the richness of the data by the dimensions. Thus, if a large number of data points are available for the dimension of Sale Date, the Sale Date dimension is included in the dimension listing 124. On the other hand, if only a small number of data points are available for the dimension of Customer Age (for example, when the product is focused on only one age group), the dimension of Customer Age is not provided in the dimension listing 124.

FIG. 1 illustrates that when the marketing executive selected the callout control 114, a callout interface 120 including a line chart 122 of the sales orders by Sale Date is presented. In one implementation, the selection of the line chart 122 for the callout interface 120 is based on a preference specified by the marketing executive. Alternatively, another user can specify that the default chart to be displayed in a callout interface 120 should be a bar chart for sales orders by the Product dimension. Thus, various users can specify their own preferred chart types, the preferred dimension to be used for the chart, etc.

While in the implementation illustrated in FIG. 1, the callout control 114 is presented upon a user's selecting a particular cell 112 of the sales order report 104, in an alternative implementation, such a callout control is part of a drop-down menu that can be selected from a toolbar at the top of the worksheet used to present the sales order report 104. Yet alternatively, such a callout control can be selected in response to use of a combination of one or more keys by a user.

Figure 2:
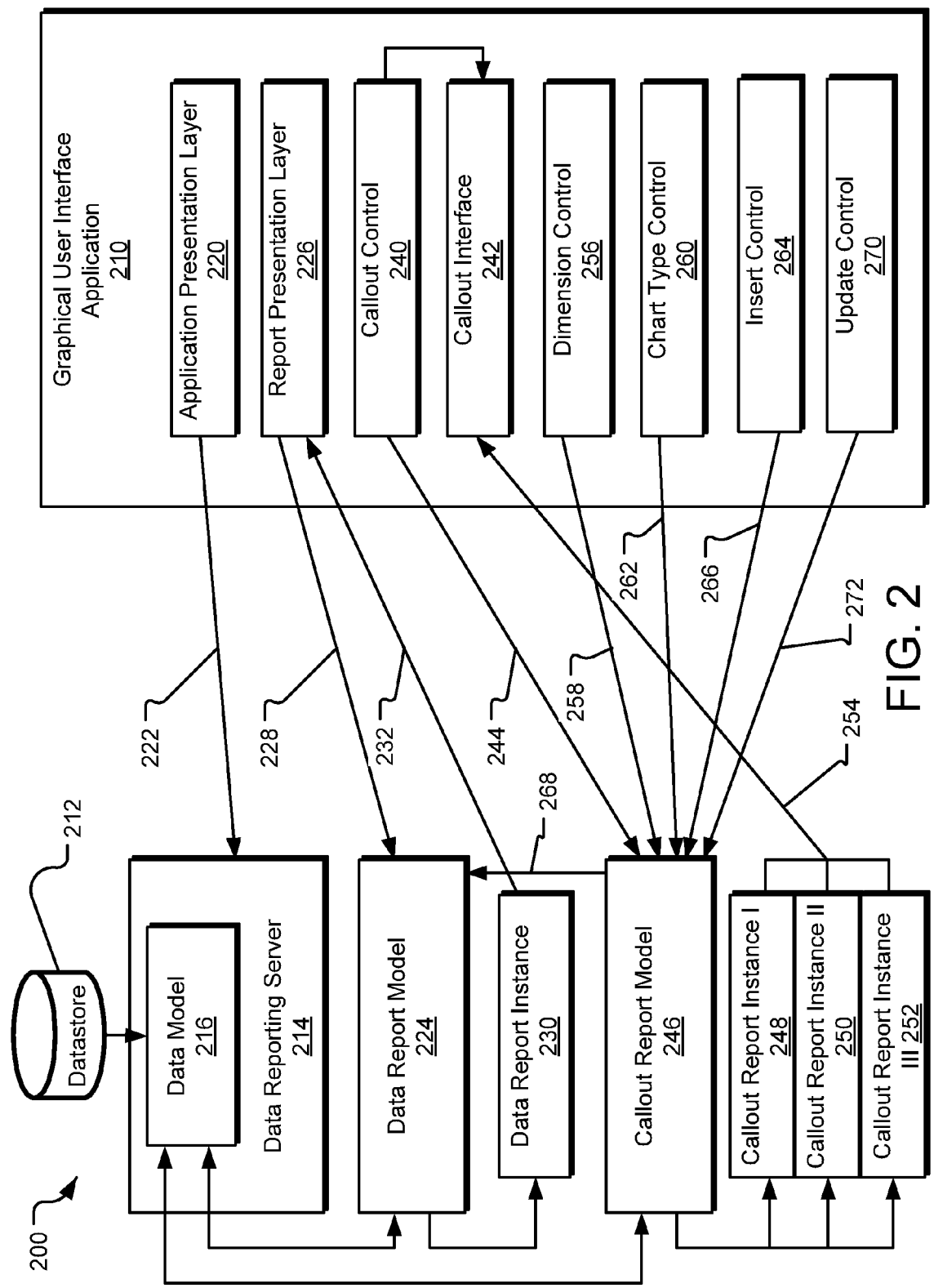
FIG. 2 illustrates the example data sources and flows for a multi-dimensional data reporting system.

FIG. 2 illustrates the example data sources and flows for a multi-dimensional data reporting system 200. The system 200 includes a graphical user interface (GUI) application 210 for presenting various reports to a user. For example, the GUI application 210 is a spreadsheet software that allows the users to present data from a datastore 212. The datastore 212 stores all commercial data regarding a company, including the sales order data, the cost data, the employment data, the client statistics, etc. A data reporting sever 214 allows various users to access the data from the datastore 212. In one implementation, the data-reporting server 214 also stores a data model 216 for storing the data retrieved from the datastore 212. For example, the data-reporting server 214 is a database server that queries the datastore 212 for generating and updating the data model 216.

The GUI application 210 allows a user to select data from the data model 216 for generating reports, presentations, etc. For example, a sales executive using the GUI application 210 uses an application presentation layer 220 to communicate 222 with the data reporting server 214 to access the data used in the various presentations. Thus, if the sales executive is interested in creating a tabular sales order report showing the sales orders for the company in a number of different countries over a number of calendar years, the sales executive uses the application presentation layer 220, such as a spreadsheet, to send a request to the data-reporting server 214 for the relevant data.

In response to the request from the application presentation layer 220, the data model 216 generates a data report model 224 that stores the data and the relevant coding for the sales order report. For example, the data report model 224 stores all the underlying data that will be used to generate the sales order report, the relationships among such underlying data, the code necessary for generating the values to be displayed in the sales order report, etc.

The GUI application 210 also includes a report presentation layer 226 for generating presentation instructions, including formatting of the data report, etc. For example, the sales executive can use such report presentation layer 226 to specify the presentation of the sales order report. Subsequently, the report presentation layer 226 communicates 228 such report presentation instructions to the data report model 224. Thus, if the sales executive specifies that the sales order report is to include the sales orders summed by country in the individual rows and the sales orders summed by the calendar years in the individual columns, appropriate instructions for such data summing is sent to the data report model 224.

The report model 224 uses the instructions from the report presentation layer 226 to generate a data report instance 230. For example, such report instance 230 includes values of the various cells in the sales order report, the headings of the various columns and rows, etc. the data report instance 230 is communicated 232 to the report presentation layer 226 for presentation to the user. Subsequently, the report presentation layer 226 presents the sales order report to the user. Thus, the report presentation layer 226 can present the sales order report to the sales executive based on the data report instance 230 using, for example, a spreadsheet software.

The GUI application 210 also provides a callout control 240 that allows a user to present a callout interface 242. For example, when a user reviewing the sales order report selects a particular cell in the sales order report, the GUI application 210 presents the callout control 240 to that user. Upon detecting the selection of the callout control 240, the GUI application 210 presents the callout interface 242. Specifically, the callout interface 242 presents a chart or a report that is different from that presented by the data report instance 230. For example, if the data report instance 230 provides a tabular sales order report with the dimensions of country and calendar year, the chart presented by the callout interface 242 uses other dimensions, such as Sale Date, etc., to generate a chart. Furthermore, the callout interface 242 also presents various other dimensions in the callout interface. For example, in one implementation, such dimensions are presented on the left side of the callout interface 242.

The callout control 240 communicates 244 with a callout report model 246 for presenting reports in the callout interface 242. For example, the callout control 240 communicates 244 information about the selected cell from the data report instance 230, user preference, etc. Thus, if a marketing executive selects the callout control 240 while a cell displaying sales orders in the United States in 2004 is selected, such information about the selected cell and the presently displayed dimensions is communicated 244 to the callout report model 246. The callout report model 246 communicates with the data model 216 to get the requisite data for the generating a callout report instance I 248. For example, if the callout report model 246 determines that there is rich underlying data available for the Sale Date dimension and that the user selecting the callout control 240 has shown preference for a line chart, the callout report model 246 generates the callout report instance I 248 using a line chart displaying sales orders by Sale Date. The callout report instance I 248 is communicated to the callout interface 242 for subsequent display by the callout interface 242.

The callout interface 242 allows a user to change the dimension of the chart or the report in the callout report instance I 248. Specifically, a user is able to select an alternative dimension from the list of dimensions on the callout interface. Thus, if a product manager reviewing the chart in the callout interface is interested in reviewing sales orders by product, the product manager can select the product dimension from the list. In response, a dimension control 256 sends a request 258 to the callout report module 246. In such a case, the callout report model 246 generates another callout report instance II 250 with the updated chart and communicates the callout report instance II 250 to the callout interface 242 for display.

Similarly, the callout interface 242 also provides a chart type control 260 that allows a user to change the type of the chart displayed by the callout interface 242. Thus, for example, a marketing executive interested in viewing the sales orders by countries in a pie chart selects the chart type to be pie chart using the chart type control 260. The chart type control 260 communicates 262 such a request for an updated chart to the callout report model 246. In such a case, the callout report model 246 generates another callout report instance III 252 with the updated chart and communicates the callout report instance III 252 to the callout interface 242 for display.

In an implementation, the callout report model 246 and the callout report instances 248-252 are stored in a temporary working space, such as a cache or a random access memory of a computing device. As a result, a user is able to manipulate such temporarily stored callout report model 246 and callout report instances 248-252 without using expensive memory space for permanent storage. Furthermore, such temporary storage also makes the callout report model 246 and callout report instances 248-252 accessible at a higher speed. In such an implementation, the temporary working space allows the users to temporarily buffer and manipulate the data from the data report model 224 before making any permanent changes to the data report model 224. Thus, the callout report instances 248-252 has less permanence than the data report instance 230.

The callout interface 242 also allows a user to insert the chart or the report displayed on the callout interface 242 into the data report instance 230 that was used to generate the callout interface 242. Thus, if after reviewing the line chart of a callout report instances 248-252, a sales executive determines that is would be useful to have such report saved for future use or to share with other people, the sales executive can select an insert control 264 on the callout interface 242. In response, the insert control 264 sends 266 instructions to the callout report model 246. Subsequently, the callout report model 246 communicates 268 the information about the charts and other data displayed by the callout interface 242 to the data report model 224. In this case, the data report model 224 updates the data report instance 230 and communicates 232 the updated report instance 230 to the report presentation layer 226. As a result of a user's selection of the insert control 264, the present version of the callout report instances 248-252 are also saved in the permanent memory for future use and/or for communication with other users.

On the other hand, the callout interface 242 also allows a user to update the data report instance 230 using the present version of the callout report instances 248-252. For example, if after reviewing a table in a callout report instance that displays the sales orders by the price point, a sales executive determines that this table is more useful than the one presented in the data report instance 230 listing the sales orders by the geography, the sales executive can select an update control 270 to update the data report instance 230 with the present callout report instance. In such a case, the update control 270 communicates 272 with the callout report model 246. Subsequently, the callout report model 246 communicates 268 the information about the charts and other data displayed by the callout interface 242 to the data report model 224. In this case, the data report model 224 updates the data report instance 230 and communicates 232 the updated report instance 230 to the report presentation layer 226. As a result of a user's selection of the update control 270, the present version of the data report instance 230 is updated by the present version of the callout report instances and saved in the permanent memory for future use and/or for communication with other users.

While the implementation of the multi-dimensional data reporting system 200 illustrated in FIG. 2 shows the GUI application 210, the data model 216, the data report model 224, etc., as being located on different computing devices, in an alternative implementations, these components are stored on the same physical or virtual server. Yet alternatively, various components, such as the data report model 224 can also be stored on a cloud based server system.

Figure 3:
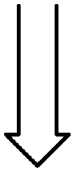
FIG. 3 illustrates example user interface of a multi-dimensional data reporting system for generating a callout interface.
Figure 3:

FIG. 3 illustrates example user interface 300 of a multi-dimensional data reporting system for generating a callout interface. Specifically, the user interface 300 includes a sales order report instance 302 generated by a sales executive, summarizing sales orders from the orders over the Internet for a company. For example, the sales executive generates the sales order report 104 by generating a report model based on a sales order data for the company. Each data column of the sales order report instance 302 summarizes the sales orders for a particular year of the calendar year 2001-2004.

The sales order report instance 304 illustrates that the sales executive selecting the cell 310 displaying the Internet sales order count in the United States for the calendar year 2004. Subsequently, a callout control 320 is displayed to the sales executive. While the user interface 300 illustrates the data reporting system generating the callout interface 320 automatically in response to the user selecting the cell 310, in an alternative implementation, the user is required to invoke such callout control 320 using a drop-down menu of the user interface, a combination of keys and/or mouse clicks, etc. Furthermore, the example user interface 300 includes the code, the metadata and other information that allows the conversion of the sales order report instance 302 into the sales order report instance 304.

Figure 4:
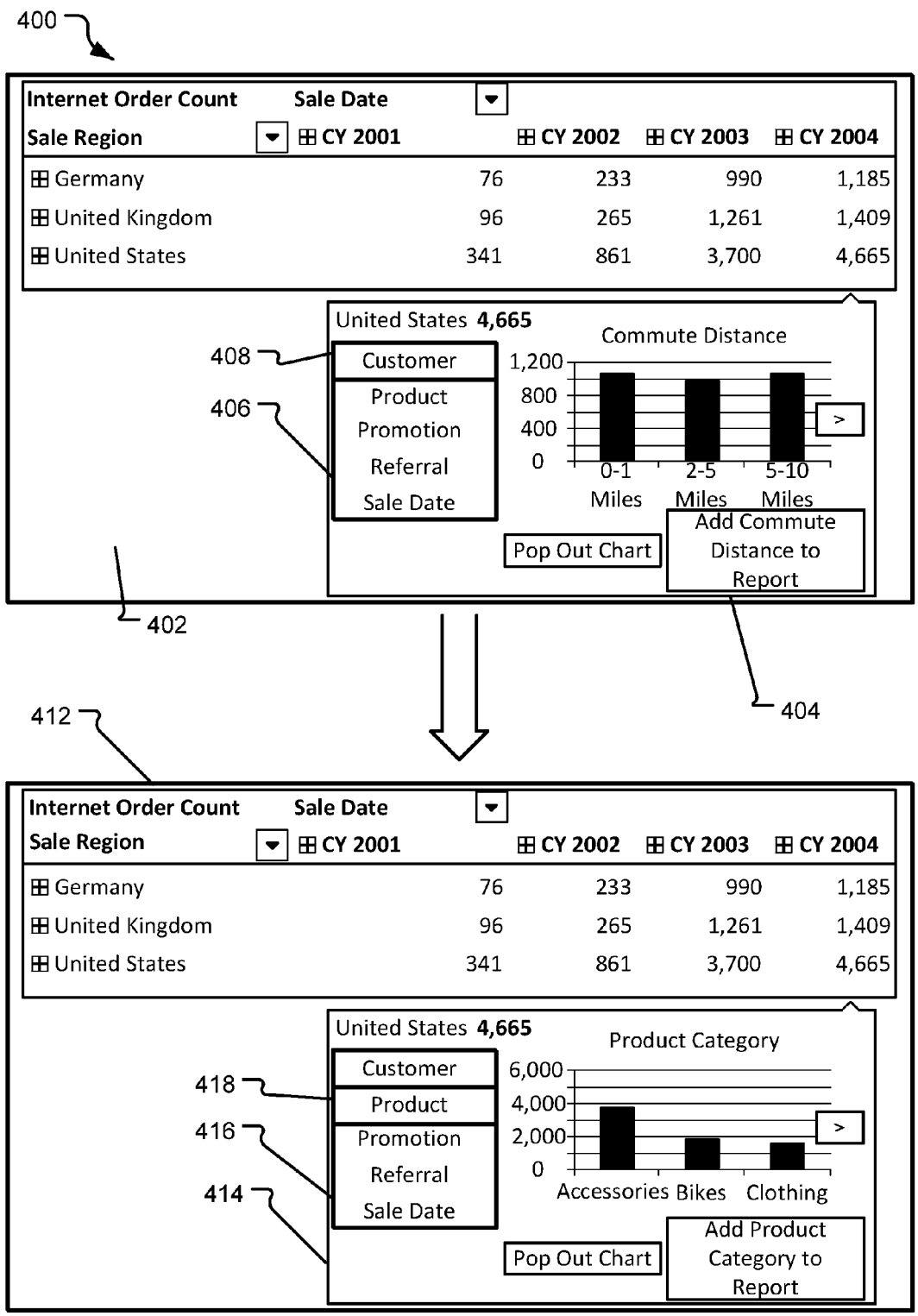
FIG. 4 illustrates example user interface of a multi-dimensional data reporting system for changing the dimensionality in a callout interface.

FIG. 4 illustrates example user interface 400 of a multi-dimensional data reporting system for changing the dimensionality in a callout interface. Specifically, FIG. 4 illustrates a sales order report instance 402 generated by a sales executive, summarizing sales orders from the orders over the Internet for a company. The user interface 400 also includes a callout interface 404 displaying an instance of a callout report. In this specific instance of the callout report, the list of dimensions 406 shows that the "Customer" dimension 408 is selected. As a result, the illustrated instance of the callout report includes a bar chart depicting the customer commute distance for the various Internet sales orders in the United States for the calendar year 2004.

However, the example user interface 400 allows a user to select another dimension for the bar chart. Thus, in an alternative sales order report instance 412, the callout interface 414 displays a different instance of a callout report. In this specific instance of the callout report, the list of dimensions 416 shows that the "Product" dimension 418 is selected. As a result, the illustrated instance of the callout report includes a bar chart depicting the products for the various Internet sales orders in the United States for the calendar year 2004. Similarly, a user is able to select any of the other dimensions, such as the "Promotion," the "Referral," and the "Sale Date," from the list of dimensions 416 to view different bar charts in the callout interface 414. Furthermore, the example user interface 400 includes the code, the metadata and other information that allows the conversion of the sales order report instance 402 into the sales order report instance 412.

Figure 5:
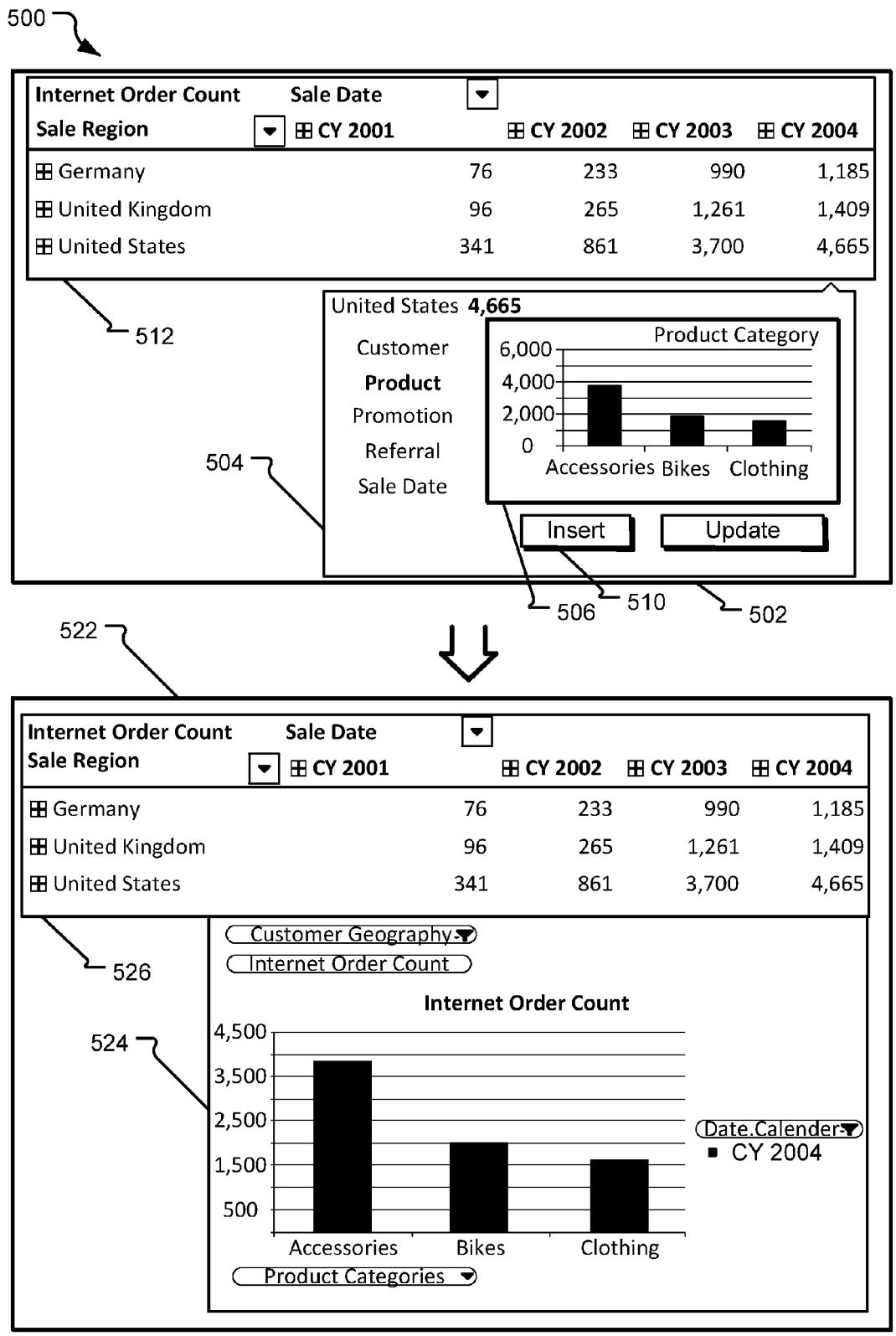
FIG. 5 illustrates example user interface of a multi-dimensional data reporting system for inserting a callout interface in an existing data report.

FIG. 5 illustrates example user interface of a multi-dimensional data reporting system for inserting a callout interface in an existing data report. Specifically, FIG. 5 illustrates a sales order report instance 502 generated by a sales executive, summarizing sales orders from the orders over the Internet for a company. The sales order report instance 502 also includes a callout interface 504 displaying an instance of a callout report 506. The callout interface 504 includes an insert control 510 that allows a user to insert the instance of the callout report 506 into a worksheet 512 displaying the sales order report.

Thus, if a user is interested in making the instance of the callout report 506 displaying the Internet sales orders by "Product" dimension permanent, the user can select the insert control 510. In response, the data reporting system inserts the multi-dimensional data and the related metadata for the instance of a callout report 506 into a report model that is used to generate the worksheet 512. The user interface 522 shows that the chart 524 depicting the Internet sales orders by Product dimension is now inserted as part of the worksheet 526. As a result, the multi-dimensional data and the metadata related to the chart 524 are no longer saved only in a temporary workspace. Therefore, a user can now share the chart 524 with other users by emailing the worksheet 526 to the other users, etc. Furthermore, the example user interface 500 includes the code, the metadata and other information that allows the conversion of the sales order report instance 502 into the sales order report instance 522.

Figure 6:
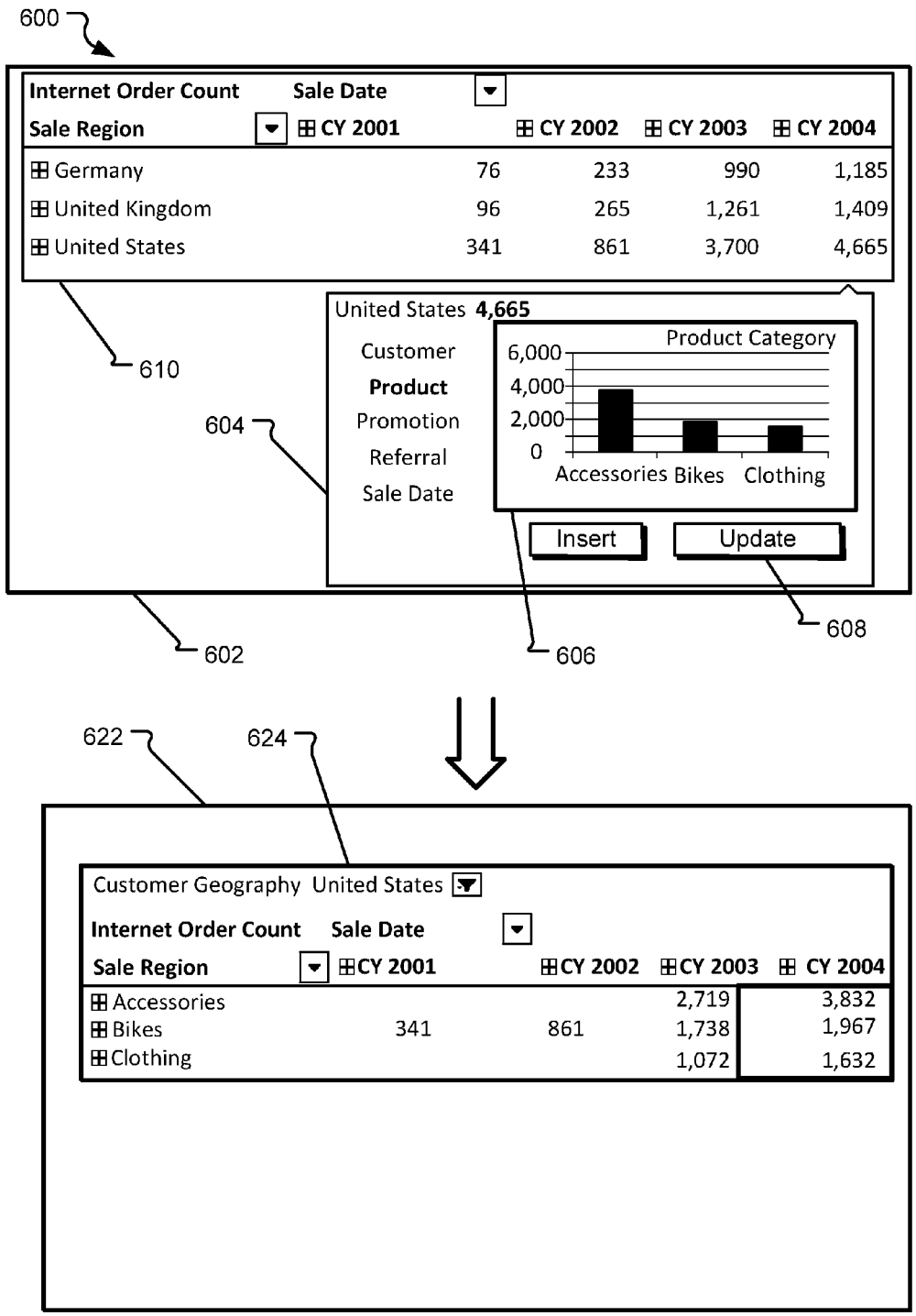
FIG. 6 illustrates example user interface of a multi-dimensional data reporting system for updating an existing data report based on a callout report.

FIG. 6 illustrates example user interface 600 of a multi-dimensional data reporting system for updating an existing data report based on a callout report. Specifically, FIG. 6 illustrates a sales order report instance 602 generated by a sales executive, summarizing sales orders from the orders over the Internet for a company. The sales order report instance 602 also includes a callout interface 604 displaying an instance of a callout report 606. The callout interface 604 also includes an update control 608 that allows a user to update the worksheet 610 displaying the sales order report with the data from the instance of the callout report 606.

For example, if a user likes the analysis presented in the instance of a callout report 606 where the Internet sales orders are categorized by the "Product" dimension, the user can select the update control 608 so that the worksheet 610 displaying the sales order report is updated so as to show each row summarizing the Internet sales orders by the products. Thus, the updated sales order report instance 622 shows the updated worksheet 624 with each row summarizing the Internet sales orders by the products. Providing such capability to update a sales order report instance with the data from a callout interface allows a user to experiment with and analyze the data using various different dimensions, charts, etc., in the callout interface and then use a preferred report into the sales order report. Subsequently, such updated sales order report is save for future use and for sharing with other users. Furthermore, the example user interface 600 includes the code, the metadata and other information that allows the conversion of the sales order report instance 602 into the sales order report instance 622.

Figure 7:
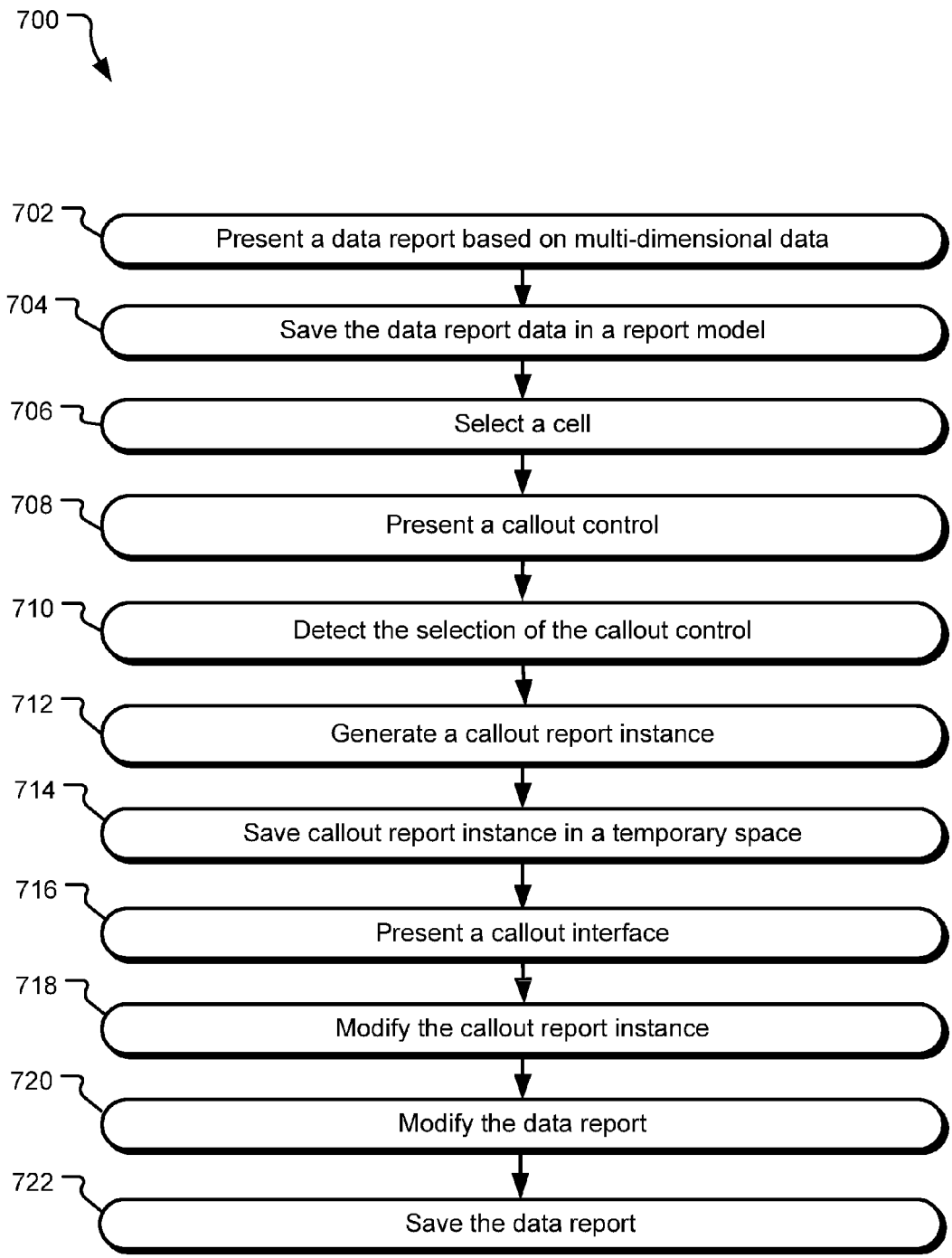
FIG. 7 illustrates example operations for using the multi-dimensional data reporting system.

FIG. 7 illustrates example operations 700 for using the multi-dimensional data reporting system. A presenting operation 702 presents a data report based on multi-dimensional data. For example, the presenting operation presents a sales order report summarizing the Internet sales orders for a company based on the country and the calendar year of the sales orders. In an example sales order report, each row displays the sales order numbers for a given country and each column displays the sales order numbers for a given calendar year. A saving operation 704 saves the multi-dimensional data and the metadata related to the data report.

A selecting operation 706 selects a cell from the displayed data report. For example, a sales executive working in the United States for the company selects the cell displaying the total number of the Internet sales orders in the United States in the calendar year 2004. Subsequently, a presenting operation 708 presents a callout control. For example, such a callout control is presented as part of the top-down menu in a user interface. Alternatively, the callout control can be presented automatically in response to the selection of a cell in the data report. If the sales executive is interested in further analyzing the total number of the Internet sales orders, the sales executive selects the callout control. A detecting operation 710 detects the selection of the callout control.

In response to the selection of the callout control a generating operation 712 generates an instance of a callout report. The generating operation 712 uses the data underlying the selected cell for generating the instance of a callout report. For example, if the selected cell displays the Internet sales order count in the United States for calendar year 2004, the generating operation 712 uses all data related to the Internet sales orders in the United States for calendar year 2004 for generating the instance of the callout report. Furthermore, the generating operation 712 also takes into account the dimensions used in displaying the data in the selected cell, the user preferences, etc., in selecting the dimensions for generating the instance of the callout report.

A saving operation 714 saves the instance of the callout report in a temporary working space together with a callout report model. Subsequently, a presenting operation 716 presents a callout interface to the user including the instance of the callout report. In addition, the presenting operation 716 also presents a listing of the dimensions in the callout interface. Furthermore the presenting operation also presents a control for changing the chart type, a control for changing the type of the callout report instance, a control for inserting the callout report instance into the data report, and a control for updating the data report using the callout report.

A modifying operation 718 modifies the callout report instance based on the selection from the user. For example, if the user selects the control to change the type of chart from a bar chart to a pie chart, the modifying operation 718 modifies the callout report instance accordingly. Similarly, if the user selects a different dimension from the listing of the dimensions, the callout report instance is modified to show data categorized using the newly selected dimension.

If the user selects the control to insert the callout report instance report into the data report, a modifying operation 720 modifies the data report to include the callout report instance. For example, a user can select to insert a chart from the callout user instance into the data report for future use. Similarly, if the user selects the control to update the data report using the data from the callout report instance, the modifying operation 720 updates the data report with the data from the callout report instance. For example, if the user likes the breakdown of the Internet sales order numbers by the "Product" dimension, as illustrated in the callout report instance, the user can select to update the data report to list the Internet sales orders by products. Subsequently, a saving operation 722 saves the updated data report so that a user can share the updated data report with other users.

Figure 8:
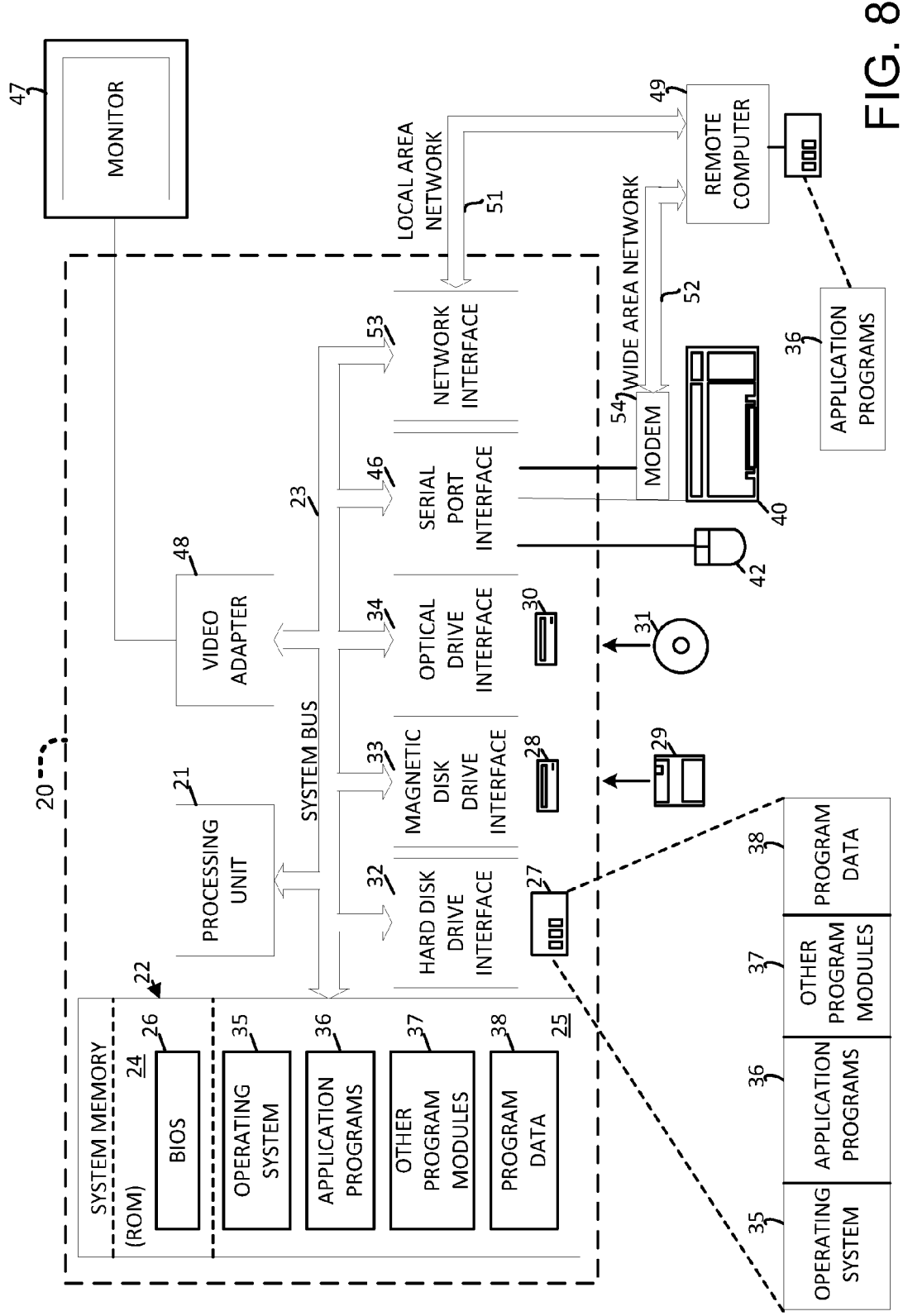
FIG. 8 illustrates an example system that may be useful in implementing the described technology.

FIG. 8 illustrates an example system that may be useful in implementing the described technology. The example hardware and operating environment of FIG. 8 for implementing the described technology includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, various components of a multi-dimensional data reporting system, such as a GUI application, a callout control component, a callout interface component, a dimension control component, a chart type control component, an insert control component, an update control component, an application presentation layer, a report presentation layer, etc., may be embodied by instructions stored in memory 22 and/or storage devices 29 or 31 and processed by the processing unit 21. The data report model, the callout report model, the data report instance, the callout report instances, and other data may be stored in memory 22 and/or storage devices 29 or 31 as persistent datastores. Further, a multi-dimensional data reporting system represents hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method performed by a computing device having a processor operatively coupled to a display, the method comprising:
with the processor,
presenting a data report on the display, the data report including a plurality of cells arranged in first and second dimensions, each of the cells containing a data point of the data report;
receiving a selection of one of the cells in the data report and a request for additional data associated with the data point in the selected cell;
retrieving and presenting on the display the requested additional data associated with the data point in the selected cell, the additional data including a breakdown of the data point along one or more dimensions in addition to the first and second dimensions;
receiving an update request associated with the presented additional data; and
updating at least one of the first and second dimensions or the cells of the presented data report based on at least one of the breakdown of the data point or the one or more dimensions.

2. The method of claim 1 wherein the presented additional data is separate from the presented data report.

3. The method of claim 2, further comprising presenting the retrieved additional data on a single workspace of a user interface along with the presented data report.

4. The method of claim 1 further comprising presenting the one or more dimensions in addition to the first and second dimensions along with the retrieved additional data.

5. The method of claim 4, further comprising adjusting the presented additional data in response to a selection of one of the one or more dimensions.

6. The method of claim 4 wherein presenting one or more dimensions further comprises presenting at least one dimension that is not presented on the data report.

7. The method of claim 4 wherein the first and second dimensions of the presented data report are different than the one or more dimensions associated with the additional data.

8. The method of claim 1 wherein presenting the retrieved additional data includes presenting the retrieved additional data as a chart.

9. A computing system, comprising:
a computing processor; and
a display and a memory operatively coupled to the computing processor, the memory containing instructions that when executed by the computing processor, cause the computing processor to perform a process including:
presenting a worksheet on the display, the worksheet including a plurality of cells arranged in one or more columns and one or more rows individually associated with a data dimension, the individual cells containing a data value along the data dimensions of the corresponding column and row;
receiving a selection of one of the cells in the presented worksheet;
presenting on the display a breakdown of the data value associated with the selected cell along an additional data dimension not present in the presented worksheet; and
updating the worksheet to present the breakdown of the data value along the additional data dimension.

10. The computing system of claim 9 wherein presenting on the display the breakdown of the data value includes presenting on the display the breakdown of the data value as a chart.

11. The computing system of claim 9 wherein:
presenting the worksheet includes presenting the worksheet in a first user interface; and
presenting on the display the breakdown of the data value includes presenting on the display the breakdown of the data value as a chart in a second user interface separate from the first user interface.

12. The computing system of claim 9 wherein:
presenting the worksheet includes presenting the worksheet in a first user interface;
presenting on the display the breakdown of the data value includes presenting on the display the breakdown of the data value as a chart in a second user interface separate from the first user interface; and
updating the worksheet includes updating the worksheet in the first user interface to present the breakdown of the data value along the additional data dimension.

13. The computing system of claim 9 wherein:
presenting the worksheet includes presenting the worksheet in a first user interface;
presenting on the display the breakdown of the data value includes presenting on the display the breakdown of the data value as a chart in a second user interface separate from the first user interface; and
updating the worksheet includes:
updating the worksheet in the first user interface to present the breakdown of the data value along the additional data dimension; and
closing the second user interface.

14. The computing system of claim 9, further comprising receiving an update request subsequent to presenting on the display the breakdown of the data value, and wherein updating the worksheet includes updating the worksheet to present the breakdown of the data value along the additional data dimension in response to the received update request.

15. The computing system of claim 9 wherein:
the additional data dimension is a first additional data dimension; and
the process further includes:
presenting a selection option for a second additional data dimension;
receiving an input to the presented selection option for the second additional data dimension; and
in response, adjusting the presented breakdown of the data value based on the second additional data dimension.

16. The computing system of claim 9 wherein:
the additional data dimension is a first additional data dimension; and
the process further includes:
presenting a selection option for a second additional data dimension;
receiving an input to the presented selection option for the second additional data dimension;
in response, adjusting the presented breakdown of the data value based on the second additional data dimension; and updating the worksheet includes updating the worksheet to present the breakdown of the data value along the second additional data dimension.

17. The computing system of claim 9 wherein:
the additional data dimension is a first additional data dimension; and
the process further includes:
 presenting a selection option for a second additional data dimension;
 receiving an input to the presented selection option for the second additional data dimension;
 in response, adjusting the presented breakdown of the data value based on the second additional data dimension;
 receiving an update request subsequent to presenting on the display the breakdown of the data value along the second additional data dimension; and
 updating the worksheet includes, in response to the received update request, updating the worksheet to present the breakdown of the data value along the second additional data dimension.

18. A method performed by a computing device having a computing processor and a display, the method comprising:
 presenting a worksheet on the display in a first user interface, the worksheet including a plurality of cells arranged in one or more columns and one or more rows individually associated with a data dimension, the individual cells containing a data value along the data dimensions of the corresponding column and row;
 receiving a selection of one of the cells in the presented worksheet in the first user interface;
 retrieving and presenting on the display a breakdown of the data value associated with the selected cell along an additional data dimension different than the data dimensions in the presented worksheet, the presented breakdown of the data value being in a second user interface different than the first user interface;
 receiving an update request subsequent to presenting on the display the breakdown of the data value in the second user interface; and
 updating the presented worksheet in the first user interface to present the breakdown of the data value along the additional data dimension.

19. The method of claim 18 wherein:
the additional data dimension is a first additional data dimension; and
the method further includes:
 presenting a selection option for a second additional data dimension;
 receiving an input to the presented selection option for the second additional data dimension; and
 in response, adjusting the presented breakdown of the data value based on the second additional data dimension.

20. The method of claim 18 wherein:
the additional data dimension is a first additional data dimension; and
the method further includes:
 presenting a selection option for a second additional data dimension;
 receiving an input to the presented selection option for the second additional data dimension;
 in response, adjusting the presented breakdown of the data value based on the second additional data dimension; and
 updating the worksheet includes, in response to the received update request, updating the worksheet to present the breakdown of the data value along the second additional data dimension.

\* \* \* \* \*